United States Patent
Blon et al.

(10) Patent No.: US 9,455,826 B2
(45) Date of Patent: *Sep. 27, 2016

(54) CIRCUIT ARRANGEMENT AND METHOD FOR TRANSMITTING SIGNALS

(71) Applicant: SILICON LINE GMBH, Munich (DE)

(72) Inventors: Thomas Blon, Munich (DE); Florian Jansen, Munich (DE); Holger Hoeltke, Munich (DE)

(73) Assignee: SILICON LINE GMBH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/181,407

(22) Filed: Feb. 14, 2014

(65) Prior Publication Data

US 2015/0043689 A1 Feb. 12, 2015

Related U.S. Application Data

(63) Continuation of application No. PCT/DE2012/200050, filed on Aug. 16, 2012.

(30) Foreign Application Priority Data

Aug. 16, 2011 (DE) .......................... 10 2011 052 759

(51) Int. Cl.
*H04L 7/04* (2006.01)
*H04L 7/10* (2006.01)
*H04L 25/02* (2006.01)
*H04L 7/00* (2006.01)

(52) U.S. Cl.
CPC ............ *H04L 7/048* (2013.01); *H04L 7/0091* (2013.01); *H04L 7/10* (2013.01); *H04L 25/0276* (2013.01)

(58) Field of Classification Search
CPC . H04L 25/0276; H04L 7/0091; H04L 7/048; H04L 7/10
USPC .................................. 375/295, 316, 354, 355
See application file for complete search history.

(56) References Cited

U.S. PATENT DOCUMENTS

| 5,968,179 A | 10/1999 | Barkey et al. | |
|---|---|---|---|
| 2005/0231399 A1* | 10/2005 | Fowler | H03M 9/00 341/100 |
| 2010/0091921 A1* | 4/2010 | Den Besten | H03L 7/189 375/354 |
| 2011/0037759 A1* | 2/2011 | Fukuda | 345/213 |
| 2011/0150137 A1* | 6/2011 | Lin et al. | 375/316 |
| 2013/0223293 A1* | 8/2013 | Jones et al. | 370/276 |
| 2013/0290581 A1* | 10/2013 | Ruberg et al. | 710/105 |
| 2015/0036756 A1* | 2/2015 | Choi et al. | 375/240.28 |

OTHER PUBLICATIONS

"SL83014 by Silicon Line GmbH", Mar. 3, 2011, URL:http/www.silicon-line.com/SL83014.htm, XP055057663.
"MIPI Alliance Specification for D-PHY", Sep. 22, 2009, URL:http//www.mipi.org/specifications/physical-layer.
(Continued)

*Primary Examiner* — Freshteh N Aghdam
(74) *Attorney, Agent, or Firm* — Studebaker & Brackett PC

(57) ABSTRACT

On the basis
of single-ended signals based on logic levels, and
of differential, in particular common-mode-based, signals,
a circuit arrangement and a corresponding method are proposed, in which a serialized signal transmission is always performed in an error-free and stable manner.

15 Claims, 4 Drawing Sheets

(56) References Cited

OTHER PUBLICATIONS

P. Dartnell et al., "Serdes Framer Interface Level 5 (SFI-5): Implementation Agreement for 40Gb/s Interface for Physical Layer Devices (OIF-SFI5-01.01)", Optical Internetworking Forum (OIF). URL:http/www.oiforum.com/public/documents/OIF-SF15-01.0.pdf.

International Search Report; PCT/DE2012/200050; Apr. 11, 2013.

* cited by examiner

CIRCUIT ARRANGEMENT AND METHOD FOR TRANSMITTING SIGNALS

CROSS-REFERENCE TO RELATED APPLICATIONS

This application is a continuation of international (WO) patent application no. PCT/DE2012/200050, filed 16 Aug. 2012, which claims the priority of German (DE) patent application no. 10 2011 052 759.1, filed 16 Aug. 2011, the contents of each being hereby incorporated herein by reference.

FIELD OF THE INVENTION

The present invention relates to a circuit arrangement and to a method for transmitting both single-ended logic-level-based data signals and clock signals, and differential, in particular common-mode-based, data signals and clock signals.

BACKGROUND OF THE INVENTION

The bit transmission layer or physical layer (PHY) is the bottom layer in the O[pen]S[ystems]I[nterconnection] layer model, also called OSI reference model and denotes a layer model of the International Standards Organisation (ISO) which in turn serves as a design basis for communication protocols in computer networks.

The physical layer (PHY) is responsible for Combining, F[orward]E[rror]C[orrection], modulation, power control, spreading (C[ode]D[ivision]M[ultiple]A[ccess]) and the like and knows neither data nor applications, only zeros and ones. PHY makes logical channels (transport channels for U[niversal]M[obile]T[elecommunications]S[ystem]) available to the security layer (D[ata]L[ink]L[ayer]) above it, in particular to a partial layer called M[edia]A[ccess]C[ontrol] Layer.

In principle D-PHY provides a flexible, low-cost and quick serial interface for communication links between components within a mobile device.

As illustrated in FIG. 4A, in modern mobile phones a data source, for example an application processor, provides image data as D-PHY signals to the M[obile]I[ndustry]P[rocessor]I[nterface]-D[isplay]S[erial]I[nterface] for display on a connected data sink, for example on a connected display. Also, a data sink such as an application processor, can receive, via a MIPI-C[amera]S[erial]I[nterface], image data in D-PHY format from a connected data source, such as from a connected camera.

A DSI or DSI-2 or CSI or CSI-2 or CSI-3 based on the D-PHY protocol comprises up to four differential data lines and a differential clock line, which electrically connect the application processor by means of a copper cable with the display and/or with the camera. The data rate per differential data line is up to 1.5 Gbps (Gigabit per second).

This conventional sending and receiving of the D-PHY-DSI signals or the D-PHY-CSI signals via one to four differential data signals and a differential clock line is illustrated by way of example in the D-PHY interface configuration of FIG. 4B by way of two data channels (=so called data lanes CH0+, CH0− and CH1+, CH1−) and a clock line (=so called clock lane CLK+, CLK−) between the modules of the master side (=data source, for example camera and/or application processor) and the modules of the slave side (=data sink, for example application processor and/or display unit).

In this context, as can be seen in FIG. 4A, up to ten copper lines are required for data transmission for each connected display or for each connected camera (for example four times two data lines and one time two clock lines).

In view of a desirable reduction in the number of lines consideration should be given to serialised signal transmission. Such serialisation is, however, conventionally prone to errors and frequently unstable.

OBJECTS AND SUMMARY OF THE INVENTION

Starting from the above-explained disadvantages and inadequacies as well as taking the outlined prior art into account the object of the present invention is to further develop a circuit arrangement of the above-mentioned type and a method of the above-mentioned type in such a way that an efficient serialised signal transmission is always performed in an error-free and stable manner.

This object is achieved by a circuit arrangement according to the invention with the herein described features and by a method according to the invention with the herein described features. Advantageous embodiments and expedient developments of the present invention are described above and below.

This object is achieved by a circuit arrangement for transmitting both
- single-ended logic-level-based data signals and clock signals, and
- differential, in particular common-mode-based, data signals and clock signals, in the form of at least one serialised common signal stream between at least one transmission arrangement assignable to at least one data source and at least one receiving arrangement assignable to at least one data sink, wherein the fact of reaching the state of synchronisation, in particular full synchronisation, between the transmission arrangement and the receiving arrangement can be communicated or signalled by the receiving arrangement to the transmission arrangement.

This object is further achieved by an embodiment of the circuit arrangement according to the invention, wherein the transmission arrangement does not start to pass through the data signals present at the input of the transmission arrangement until the notification or the signal has been received that the state of synchronisation has been achieved.

This object is further achieved by an embodiment of the circuit arrangement according to the invention, wherein the transmission arrangement comprises:
- at least one input for the data signals and clock signals,
- at least one transmission interface logic downstream of the input for picking up the data signals and clock signals,
- at least one serialiser downstream of the transmission interface logic for generating the common signal stream,
- at least one clock generator, in particular phase-locked-loop, for example clock multiplier unit, provided downstream of a clock module of the transmission interface logic, upstream of the serialiser and for generating at least one reference clock,
- at least one output driver downstream of the serialiser and
- at least one output downstream of the output driver for transmitting the common signal stream to the receiving arrangement.

This object is further achieved by an embodiment of the circuit arrangement according to the invention, wherein the serialiser comprises:
- at least one framer downstream of the transmission interface logic for generating at least one frame recognisable in the receiving arrangement for the common signal stream as well as
- at least one multiplexer downstream of the framer for generating the common signal stream.

This object is further achieved by an embodiment of the circuit arrangement according to the invention, wherein both the single-ended, logic-level-based data signals and the differential data signals can be applied to the framer and in that the framer, by means of at least one coder, in particular by means of at least one 5b/6b coder block, embeds the differential data signals in the stream of the single-ended, logic-level-based data signals.

This object is further achieved by an embodiment of the circuit arrangement according to the invention, wherein the receiving arrangement comprises:
- at least one input for the common signal stream transmitted by the transmission arrangement,
- at least one input amplifier for picking up the common signal stream,
- at least one clock and data recovery unit for recovering the data signals and clock signals from the common signal stream,
- at least one clock module of at least one receiving interface logic downstream of the clock and data recovery unit,
- at least one deserialiser downstream of the clock and data recovery unit for re-parallelising the data signals and for assigning the re-parallelised data signals to the receiving interface logic and
- at least one output downstream of the receiving interface logic for the data signals and clock signals.

This object is further achieved by an embodiment of the circuit arrangement according to the invention, wherein the deserialiser comprises:
- at least one demultiplexer downstream of the clock and data recovery unit for re-parallelising the data signals as well as
- at least one deframer downstream of the demultiplexer for assigning the re-parallelised data signals to the receiving interface logic.

This object is further achieved by an embodiment of the circuit arrangement according to the invention, wherein the deframer separates the differential data signals by means of at least one decoder, in particular by means of at least one 6b/5b decoder block, from the single-ended, logic-level-based data signals and assigns the re-parallelised data signals to the respective data lines.

This object is further achieved by an embodiment of the circuit arrangement according to the invention, wherein the common signal stream is transferable between the transmission arrangement and the receiving arrangement
- via at least one optical medium, in particular via at least one optical waveguide, for example via at least one glass fibre and/or via at least one plastic fibre, and/or
- via at least one electrical or galvanic, in particular one-bit-wide, link, in particular via at least one copper cable and/or via at least one electrical line, arranged e.g. on at least one printed circuit board.

This object is further achieved by an embodiment of the circuit arrangement according to the invention, wherein the electrical or galvanic link has assigned to it,
- in the transmission arrangement, at least one switch, provided in particular with at least one logic module, for closing the electrical or galvanic link to the receiving arrangement, and
- in the receiving arrangement, at least one switch, provided in particular with at least one logic module, for closing the electrical or galvanic link to the transmission arrangement.

This object is further achieved by an embodiment of the circuit arrangement according to the invention, wherein the fact of reaching the state of synchronisation can be communicated or signalled by the deserialiser, in particular by the demultiplexer, via the logic module of the switch assigned to the receiving arrangement, via the electrical or galvanic link and via the logic module of the switch assigned to the transmission arrangement to the input of the transmission arrangement.

This object is further achieved by a method for transmitting both
- single-ended logic-level-based data signals and clock signals, and
- differential, in particular common-mode-based, data signals and clock signals, in the form of at least one serialised common signal stream between at least one transmission arrangement assignable to at least one data source and at least one receiving arrangement assignable to at least one data sink, wherein the fact of reaching the state of synchronisation, in particular full synchronisation, between the transmission arrangement and the receiving arrangement is communicated or signalled by the receiving arrangement to the transmission arrangement.

This object is further achieved by an embodiment of the method according to the invention, wherein the transmission arrangement does not start to pass through the data signals applied to the input of the transmission arrangement, until the notification or signal has been received that the state of synchronisation has been reached.

This object is further achieved by an embodiment of the method according to the invention, wherein
- the transmission arrangement synchronises itself with the reference clock and
- the receiving arrangement synchronises itself with the data rate of the common signal stream as well as with at least one position of the frame of the common signal stream.

This object is further achieved by a use of the circuit arrangement and/or of the method according to the invention during synchronisation of at least one serial and/or bundled, in particular CSI protocol-based and/or CSI-2 protocol-based and/or CSI-3 protocol-based and/or DSI protocol-based and/or DSI-2 protocol-based transmission of both single-ended logic-level-based data signals and clock signals and differential, in particular common-mode-based, data signals and clock signals, in particular D-PHY data signals and D-PHY clock signals, for example up to 4-bit-wide MIPI-D-PHY data signals and MIPI-D-PHY clock signals, between at least one data source, in particular at least one e.g. high-resolution camera acting e.g. as an image source and/or at least one application processor, and at least one data sink, in particular at least one application processor and/or at least one e.g. high-resolution display unit and/or a display unit acting e.g. as an image sink, for example at least one display or at least one monitor.

According to the invention a circuit arrangement and a method are thus proposed, by means of which
- the single-ended L[ow]P[ower] data corresponding to signals based on logic levels and the differential H[igh]S[peed] data corresponding to signals based in particular on common mode signals are serialised to form a common signal stream. If for example one to four data channels are transmitted after being serialised, an error-free and stable transmission is possible, if and as long as a clock is applied to the serialisation element or the serialiser.

A (reference) clock of this kind can be provided by at least one clock generator, in particular by at least one phase-locked loop (PLL), for example by at least one clock multiplier unit (CMU).

The principal problem when booting up the serial data link consists in that the clock generator in the transmission arrangement must synchronise with the reference clock and in that then a C[lock/]D[ata]R[ecovery] in the receiving arrangement must synchronise with the data rate of the common signal stream as well as with the frame positions of the data.

If data is applied to the serialisation element or the serialiser, in particular its multiplexer, before the entire data transmission path is completely synchronised, this data gets lost.

The time required for full synchronisation of the transmission path is known in terms of magnitude and is dependent, among others, on the data rate at the serial interface. However, further factors dependent on environmental conditions have to be taken into account, such as operating voltage, temperature and also the process parameters of the semiconductor technology used.

In order to prevent the data signals, in particular the D-PHY data applied to the transmission arrangement from getting lost, provision may be made for the data source, in particular the D-PHY data source, to wait for a certain minimum of time after applying the reference clock plus a safety margin, before data is applied.

However, in order not to lose any time when booting up the serial transmission path, the receiving arrangement according to the invention informs the transmission arrangement, when the receiving arrangement has reached synchronisation, in particular full synchronisation; this information is then made accessible to the data source, in particular the D-PHY data source, by the transmission arrangement.

Conveniently the receiving arrangement does not start to indeed pass through the H[igh]S[peed] data applied to the transmission arrangement until notification of synchronisation has been received, so that an error-free and stable serial transmission of signals, in particular of D-PHY signals, is ensured, thereby reliably avoiding data losses and bit errors during serialisation of the differential data lines and the differential clock line of the D[isplay]S[erial]I[nterface] and/or the C[amera]S[erial]I[nterface].

The present invention can be typically applied during synchronisation of at least one serial and/or bundled, in particular CSI-protocol-based and/or CSI-2-protocol-based and/or CSI-3-protocol-based and/or DSI-protocol-based and/or DSI-2-protocol-based transmission of both single-ended logic-level-based data signals and clock signals and differential, in particular common-mode-based data signals and clock signals, in particular D-PHY data signals or D-PHY clock signals, for example one-to-four-bit wide MIPI-D-PHY data signals and MIPI-D-PHY clock signals, between at least one data source, in particular at least for example a high-resolution camera and/or a camera acting as an image source and/or at least one application processor, and at least one data sink, in particular at least one application processor and/or at least one high-resolution display unit or a display unit acting for example as an image sink, for example at least one display or at least one monitor.

BRIEF DESCRIPTION OF THE DRAWINGS

As already discussed above, there are various possibilities for embodying and further developing the teaching of the present invention in an advantageous manner. For this purpose, on the one hand reference is made to the explanations above and to the dependent claims, and on the other hand further embodiments, features and advantages of the present invention are explained in greater detail below, inter alia by way of the exemplary embodiments illustrated by FIG. 1A to FIG. 3.

It is shown in.

Like or similar embodiments, elements or features are provided with identical reference numerals in FIG. 1A to FIG. 4B.

DETAILED DESCRIPTION OF THE INVENTION

Figure 1A:
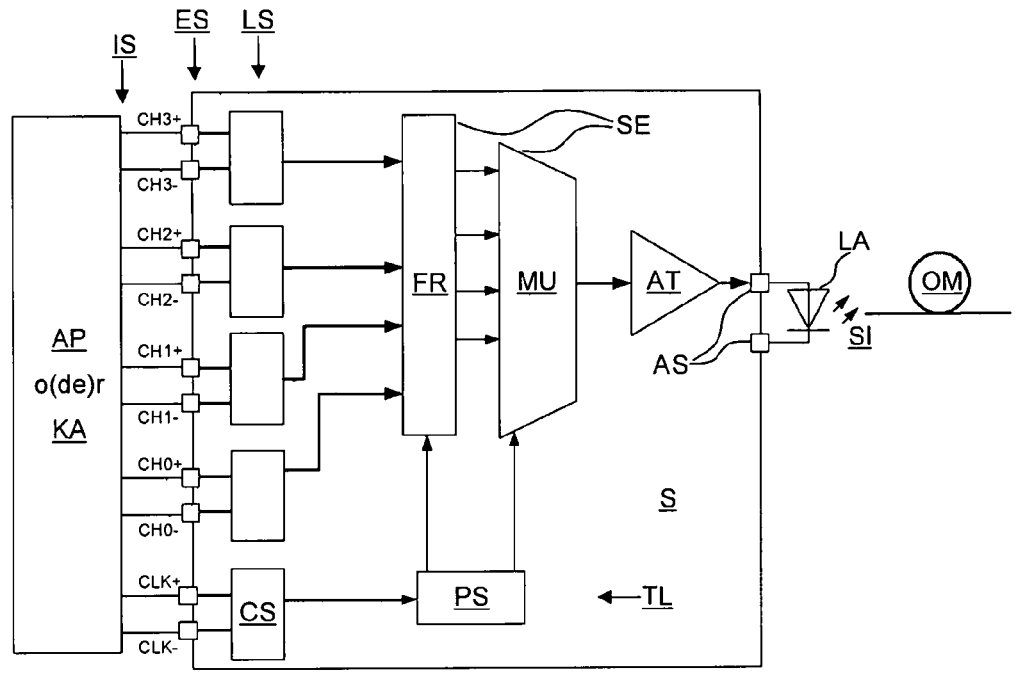
FIG. 1A in a conceptual schematic illustration an embodiment of the transmission arrangement according to the present invention, which operates according to the method of the present invention.
Figure 2A:
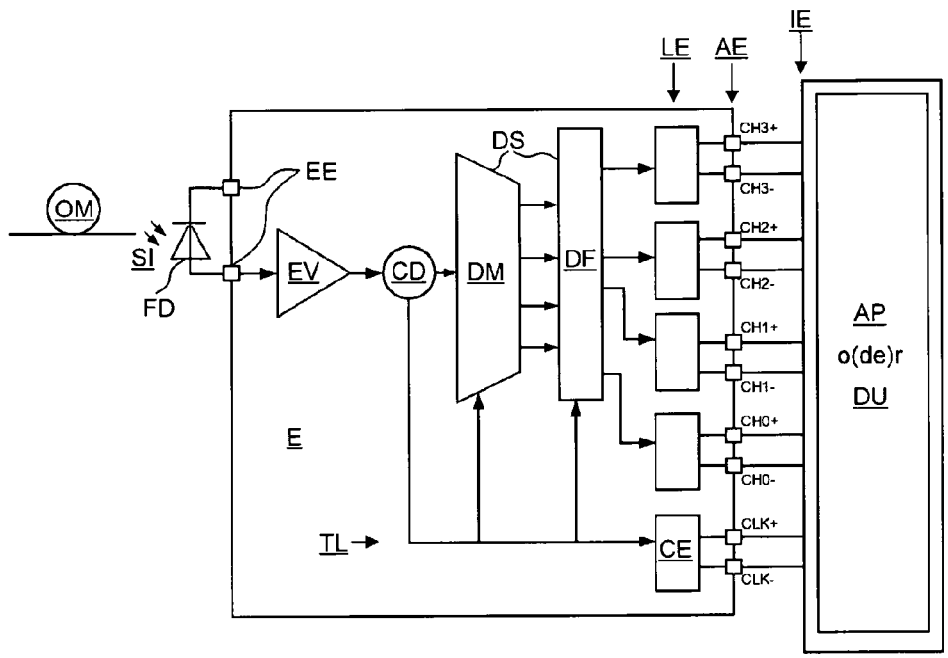
FIG. 2A in a conceptual schematic illustration an embodiment of the receiving arrangement associated with the transmission arrangement of FIG. 1A, which operates according to the method of the present invention.

In principle it is possible, by means of the embodiment shown in FIG. 1A of a transmission arrangement S according to the present invention and by means of an embodiment shown in FIG. 2A of a receiving arrangement E according to the present invention, which results in a circuit arrangement A (see FIG. 3) according to the present invention (in terms of the present invention, it is possible, to realise and to operate the transmission arrangement S and the receiving arrangement E independently of each other), to realise and to operate a cable-based link which has been multiplexed and thus serialised on an optical basis, in particular on the basis of at least one optical medium, for example on the basis of an optical waveguide OM (see detail illustrations in FIG. 1A, FIG. 2A), such as on the basis of at least one glass fibre and/or on the basis of at least one plastic fibre and/or which has not been multiplexed on an electrical or galvanic basis, in particular on the basis of at least one electrical or galvanic link GA, (see FIG. 3), for example on the basis of at least one copper cable and/or on the basis of at least one electrical line such as arranged on a printed circuit board.

FIG. 1A shows an embodiment of the principal construction of a transmission arrangement S for connection to a D[isplay]S[erial]I[nterface] data transmission interface IS or a C[amera]S[erial]I[nterfacee]-data transmission interface IS.

The image data generated in the application processor AP or in the camera KA are made available on four data lines or channels CH0+, CH0−, CH1+, CH1−, CH2+, CH2−, CH3+, CH3− as D-PHY signals at the up-to-four-bit-wide data transmission interface IS together with the D-PHY correct clock signals CLK+, CLK−.

The transmission arrangement S picks these signals up at an integrated Interface Logic LS, the blocks of which can prove that they have at least one state machine for correct interpretation of the D-PHY signals and for differentiating between high-frequency data streams (so-called H[igh]S[peed] data) and low-frequency data streams (so-called L[ow]S[peed] data).

A framer FR following in the transmission arrangement S (see also detail view in FIG. 1B) ensures D[irect]C[urrent] balancing of the input signal and generates a frame recognisable on the receiving side (see FIG. 2A), which allows the receiving arrangement E (see FIG. 2A) to re-assign the received data to the correct output data lines or output channels CH0+, CH0−, CH1+, CH1−, CH2+, CH2−, CH3+, CH3−.

Figure 1B:
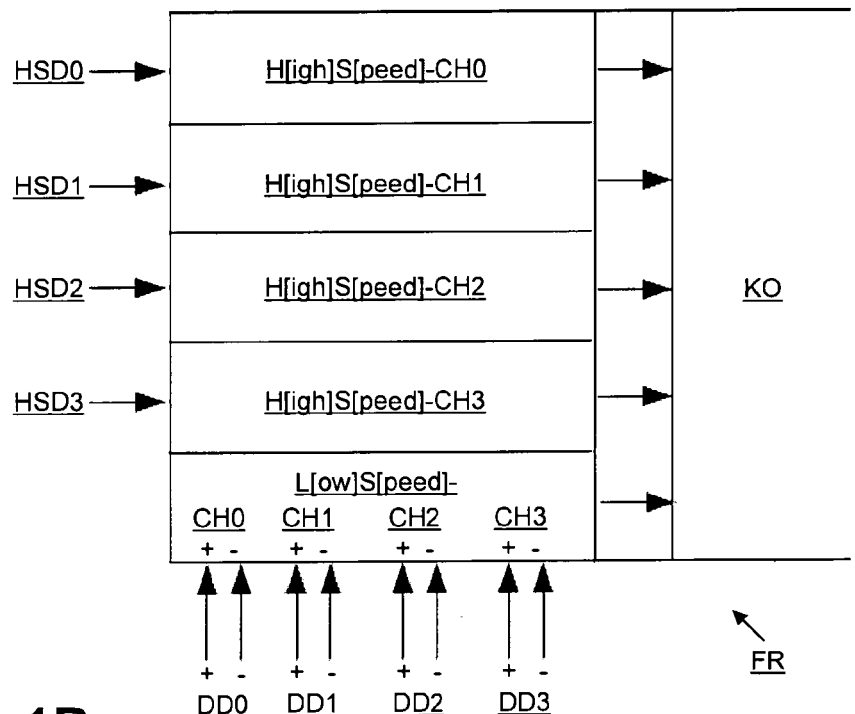
FIG. 1B in a conceptual schematic illustration a detail view of an embodiment of the framer of the transmission arrangement in FIG. 1A.

In detail both the logic-level-based single-ended data signals HSD0, HSD1, HSD2, HSD3 and the differential data signals DD0+, DD0−, DD1+, DD1−, DD2+, DD2−, DD3+, DD3− can be applied to the framer FR according to FIG. 1B. By means of its coder KO configured as a 5b/6b coding block the framer FR according to FIG. 1B embeds these differential data signals DD0+, DD0−, DD1+, DD1−, DD2+, DD2−, DD3+, DD3− into the stream of the single-ended logic-level-based data signals HSD0, HSD1, HSD2, HSD3.

A multiplexer MU, in particular H[igh]S[peed] Mux, adjoining the frame FR, uses a clock generator PS configured as a phase-locked-loop, in particular as a C[lock]M[ultiplier]U[nit], to generate the high-frequency serial or bundled transmission signal, which is made available at the output AS of the transmission arrangement S by means of an output driver AT. The framer FR and the multiplexer MU together form the serialiser SE.

The D-PHY clock signal provided via the clock port CLK+, CLK− and via the clock module CS of the interface logic LS by means of clock generator PS is used as (clock) reference for the serialiser SE, in particular for its multiplexer MU, and is embedded into the serial data stream, i.e. into the serialised output signal. This creates the common signal stream SI which is communicated to the receiving arrangement E (see FIG. 2A).

As can further be seen in FIG. 1A, the output driver AT is implemented as an integrated laser driver for driving at least one directly connected laser LA, in particular for driving at least one V[ertical]C[avity]S[urface]E[mitting]L[aserdiode].

FIG. 2A shows an embodiment for the principal construction of a receiving arrangement E for connection to a D[isplay]S[erial]I[nterface] data transmission interface IE or also a C[amera]S[erial]I[nterface] data transmission interface IE.

The serial or bundled data sent by the transmission arrangement S (see FIG. 1A) is picked up via an input amplifier EV of the receiving arrangement E and supplied to an integrated clock or data recovery CD.

This integrated clock or data recovery CD regenerates the original D-PHY clock from the common signal stream SI, which is then made directly available again to the D[isplay]S[erial]I[nterface] or the C[amera]S[erial]I[nterface] via the clock module CE of the interface logic LE. The remaining serial data stream is debundled and parallelised via a demultiplexer DM and handed over to a deframer DF (see also detail in FIG. 2B), which in principle is the mirror image of framer FR according to FIG. 1B. The demultiplexer DM and deframer DF together form the deserialiser DS.

Figure 2B:
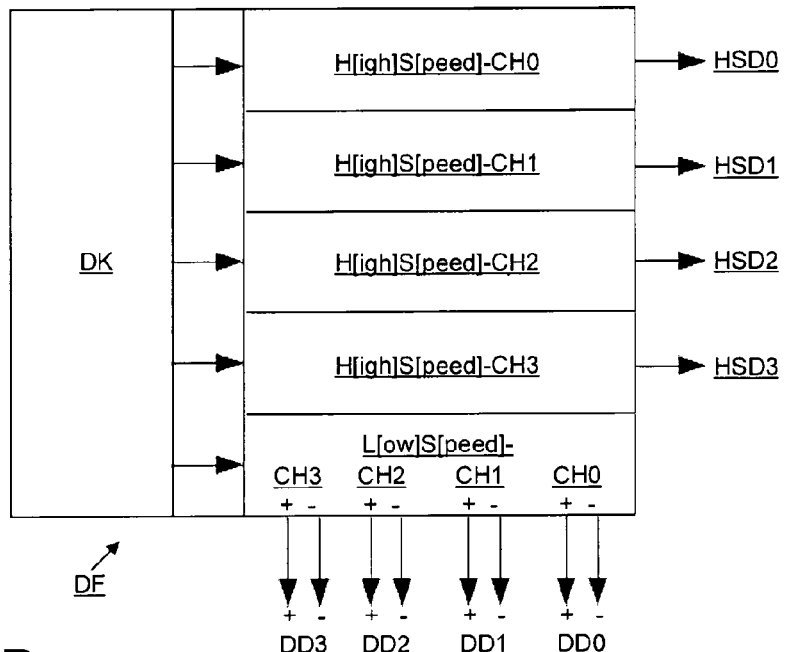
FIG. 2B in a conceptual schematic illustration a detail view of an embodiment of the deframer of the receiving arrangement of FIG. 2A.

In detail the deframer FR of FIG. 2B, by means of its decoder DK configured as a 6b/5b decoder block, can separate the differential data signals DD0+, DD0−, DD1+, DD1−, DD2+, DD2−, DD3+, DD3− from the single-ended, logic-level-based data signals HSD0, HSD1, HSD2, HSD3 and re-assign the re-parallelised data signals to the respectively applicable data lines CH0+, CH0−, CH1+, CH1−, CH2+, CH2−, CH3+, CH3−.

The interface logic blocks LE shown in the receiving arrangement E may comprise at least one state machine respectively for correct interpretation of the D-PHY logic signals and for differentiating between high-frequency data streams and low-frequency data streams.

As can also be seen in the illustration in FIG. 2A, the input amplifier EV is implemented as an integrated transimpedance amplifier, which allows a photo diode FD to be directly connected to the receiving arrangement E.

In this way, with regard to the circuit arrangement A (see FIG. 3), it is possible according to the invention to realise and to operate the cable-based multiplexed link between the transmission arrangement S (see FIG. 1A) and the receiving arrangement E (see FIG. 2A) on an optical basis, i.e. by means of an optical waveguide OM configured e.g. in form of a glass fibre and/or in form of a plastic fibre.

Figure 3:
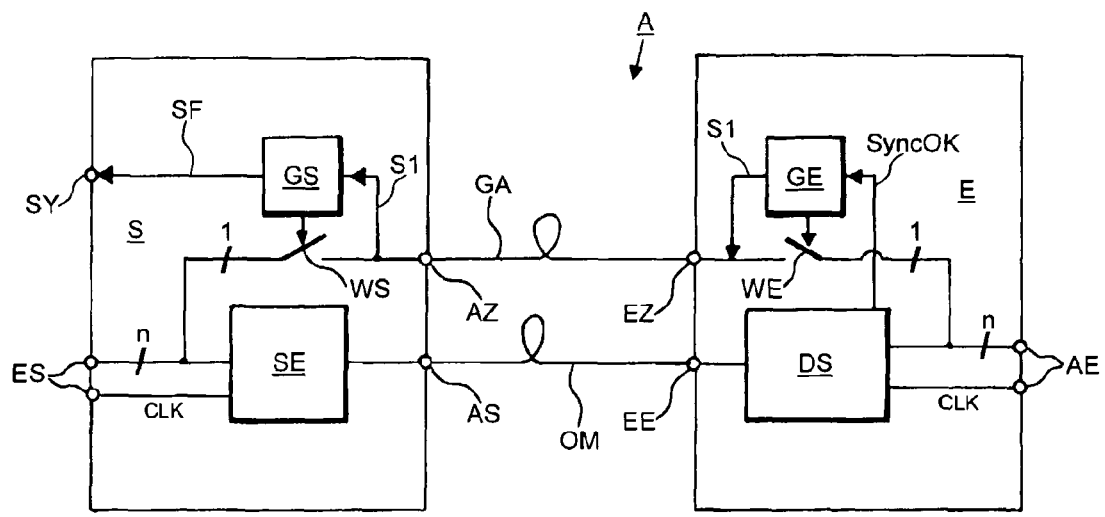
FIG. 3 in a conceptual schematic illustration an embodiment of the circuit arrangement according to the present invention, which operates according to the method of the present invention.
Figure 4A:
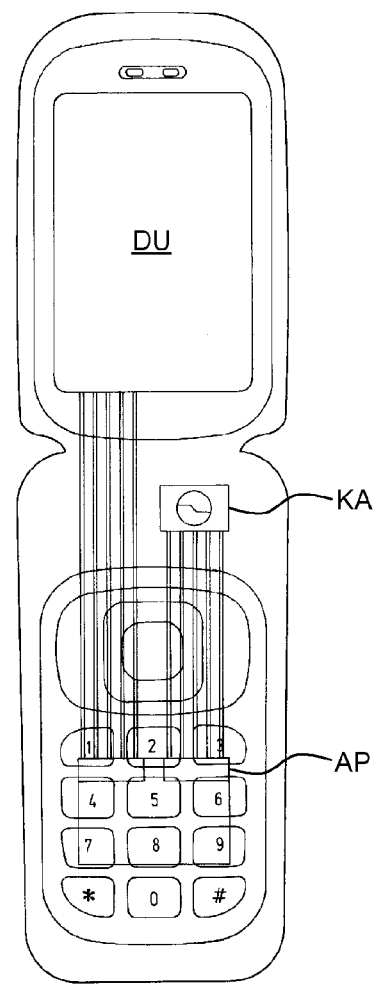
FIG. 4A in a conceptual schematic illustration an embodiment of an arrangement from prior art.
Figure 4B:
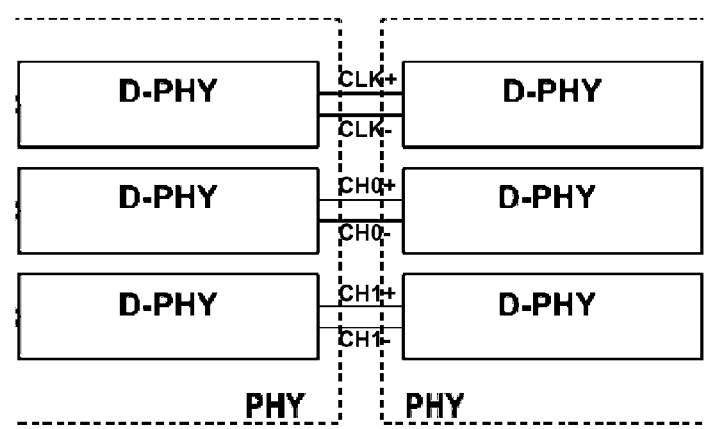
FIG. 4B in a conceptual schematic illustration an embodiment of an interface configuration with two data channels and one clock line, which forms the basis for the arrangement shown in FIG. 4A.

FIG. 3 represents an embodiment for the overall view of the transmission arrangement S (see FIG. 1A) and the receiving arrangement E (see FIG. 2A). This is a D-PHY transmission path with a serial link or with a serialised data stream.

To this end the D-PHY-H[igh]S[peed]/L[ow]P[ower] data is bundled by the transmission arrangement S (see FIG. 1A) comprising essentially the serialiser SE and in particular the multiplexer MU, and transmitted as a serial data stream to the receiving arrangement E (see FIG. 2A).

This receiving arrangement E (see FIG. 2A) essentially comprising the deserialiser DS, and here in particular the demultiplexer DM, debundles the serial data and re-outputs it in the original form as D-PHY-H[igh]S[peed]/L[ow]P[ower] data. The D-PHY-CL[oc]K applied to the transmission arrangement S (see FIG. 1A) is used as clock reference for the serialiser SE and is embedded in the serial data stream. The receiving arrangement E (see FIG. 2A) regenerates this clock and re-outputs it as D-PHY-CL[oc]K.

Now, if L[ow]P[ower] data only is to be temporarily or continuously transmitted on only one of the n D-PHY links or D-PHY lanes, the corresponding inputs ES of the transmission arrangement S (see FIG. 1A) can be connected with another port or a further port AZ of the transmission arrangement S (see FIG. 1A) by at least one switch WS (not shown in FIG. 1A merely for reasons of clarity of the illustration) acted upon in particular by at least one logic module GS.

In an analogue manner the outputs AE of the receiving arrangement E (see FIG. 2A) can be connected with another port or a further port EZ of the receiving arrangement E (see FIG. 2A) by at least one switch WE, (not shown in FIG. 2A merely for reasons of clarity of the illustration) acted upon in particular by at least one logic module GE.

This port AZ on the transmission side and this port EZ on the receiving side are connected with each other by means of at least one electric or galvanic link GA, in particular by means of at least one one-bit-wide copper cable or by means of at least one electrical line arranged e.g. on at least one printed circuit board.

This electrical or galvanic link GA between the port AZ on the transmission side and the port EZ on the receiving side is opened while booting up the serial transmission path on both sides by means of the switch WS on the transmission side/by means of the switch WS on the receiving side, in order to address the principal problem during booting up of the serial data link, whereupon the clock generator PS in the transmission arrangement S (see FIG. 1A) must synchronise with the reference clock and thereafter a C[lock/]D[ata]R [ecovery] or clock recovery CD in the receiving arrangement E (see FIG. 2A) must synchronise with the data rate of the serial data stream as well as with the frame positions of the data.

If data is applied to the serialiser SE, in particular its multiplexer MU, before the entire data transmission path has been completely synchronised, this data is lost.

In order to avoid such losses, the demultiplexer DM contained in the deserialiser DS on the receiving side sends the SyncOK signal to the logic module or the block logic GE on the receiving side, indicating that full synchronisation has been reached.

This block logic GE on the receiving side sends a signature S1 via the electrical or galvanic link GA to the logic module or the block logic GS in the transmission arrangement S or in the transmission building block.

This block logic GS on the transmission side in turn outputs a ready-signal SF from the synchronisation port SY of the transmission building block S.

This synchronisation port SY can be read by the data source, in particular by the D-PHY data source. As soon as the data source recognises that the state of full synchronisation has been reached in this way, the data source, via the input ES of the transmission building block S, can immediately apply data, in particular D-PHY data, to the transmission building block S.

At the same time as, or immediately after, it has been recognised that the synchronisation state has been reached, H[igh]S[peed] data actually applied to the transmission arrangement S (see FIG. 1A) is starting to be passed through, so that an error-free and stable serial transmission of D-PHY signals is ensured, in other words, so that data losses and bit errors during serialising the differential data lines and the differential clock line of the D[isplay]S[erial]I[nterface] and/or the C[amera]S[erial]I[nterface] are reliably avoided.

LIST OF REFERENCE NUMERALS

A circuit arrangement
E receiving arrangement
S transmission arrangement
AE output of the receiving arrangement E
AP application processor
AS output of the transmission arrangement S
AT output driver, in particular laser driver
AZ other or further or additional output of the transmission arrangement S
CD clock and data recovery unit
CE clock module of the receiving interface logic LE
CH0± first data line or first channel
CH1± second data line or second channel
CH2± third data line or third channel
CH3± fourth data line or fourth channel
CLK± clock line or clock channel
CS clock module of the transmitting interface logic LS
DD0± differential signal, in particular common-mode-based data signal on the first data line or the first channel CH0±
DD1± differential signal, in particular common-mode-based data signal on the second data line or the second channel CH1±
DD2± differential signal, in particular common-mode-based data signal on the third data line or the third channel CH2±
DD3± differential signal, in particular common-mode-based data signal on the fourth data line or the fourth channel CH3±
DF deframer
DK decoder, in particular 6b/5b-Decoderblock, of deframer DF
DM demultiplexer
DS deserialisation element or deserialiser
DU display unit
EE input of the receiving arrangement E
ES input of the transmission arrangement S
EV input amplifier, in particular transimpedance amplifier
EZ other or further or additional input of the receiving arrangement E
FD photo diode
FR framer
GA electrical or galvanic link, in particular copper cable or electrical line arranged e.g. on a printed circuit board
GE Logic module of the receiving arrangement E
GS Logic module of the transmission arrangement S
HSD0 single-ended logic-level-based data signal on the first data line or the first channel CH0±
HSD1 single-ended logic-level-based data signal on the second data line or the second channel CH1±
HSD2 single-ended logic-level-based data signal on the third data line or the third channel CH2±
HSD3 single-ended logic-level-based data signal on the fourth data line or the fourth channel CH3±
IE data-sink-related CSI and/or CSI-2 and/or CSI-3 and/or DSI and/or DSI-2 interface
IS data-source-related CSI and/or CSI-2 and/or CSI-3 and/or DSI and/or DSI-2 interface
KA camera
KO coder, in particular 5b/6 coder block of framer FR
LA laser
LE receiving interface logic
LS transmitting interface logic
MU multiplexer
OM optical medium, in particular optical waveguide, e.g. glass fibre and/or plastic fibre
PS clock generator, in particular phase-locked-loop, for example clock multiplier unit
S1 signature
SE serialisation element or serialiser
SF ready-signal
SI common signal stream
SY synchronisation port of transmission arrangement S
SyncOK signal when synchronisation has been reached
TL clock line
WE switch of the receiving arrangement E
WS switch of the transmission arrangement S While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A circuit arrangement for transmitting both
single-ended logic-level-based data signals and single-ended logic-level-based clock signals, and
differential data signals and differential clock signals,
in a form of one serialised common signal stream between at least one transmission arrangement assigned to at least one data source and at least one receiving arrangement assigned to at least one data sink, wherein reaching a state of synchronisation between the transmission arrangement and the receiving arrangement is communicated or signalled by the receiving arrangement to the transmission arrangement,
wherein the circuit arrangement comprises at least one serialiser for generating the common signal stream and at least one clock generator.

2. The circuit arrangement according to claim 1, wherein the transmission arrangement does not start to pass through the data signals present at the input of the transmission arrangement until a notification or a signal has been received that the state of synchronisation has been achieved.

3. The circuit arrangement according to claim 1, wherein the transmission arrangement comprises:
at least one input for the data signals and clock signals,
at least one transmission interface logic downstream of the input for picking up the data signals and clock signals,
at least one output driver downstream of the serialiser and
at least one output downstream of the output driver for transmitting the common signal stream to the receiving arrangement, wherein
the at least one serialiser is downstream of the transmission interface logic for generating the common signal stream, and
the at least one clock generator is provided downstream of a clock module of the transmission interface logic, upstream of the serialiser and for generating at least one reference clock.

4. The circuit arrangement according to claim 3, wherein the serialiser comprises:
at least one framer downstream of the transmission interface logic for generating at least one frame recognisable in the receiving arrangement for the common signal stream as well as
at least one multiplexer downstream of the framer for generating the common signal stream.

5. The circuit arrangement according to claim 4, wherein both the single-ended, logic-level-based data signals and the differential data signals is applied to the framer and in that the framer, by means of at least one coder, embeds the differential data signals in the stream of the single-ended, logic-level-based data signals.

6. The circuit arrangement according claim 1, wherein the receiving arrangement comprises:
at least one input for the common signal stream transmitted by the transmission arrangement,
at least one input amplifier for picking up the common signal stream,
at least one clock and data recovery unit for recovering the data signals and the clock signals from the common signal stream,
at least one clock module of at least one receiving interface logic downstream of the clock and data recovery unit,
at least one deserialiser downstream of the clock and data recovery unit for re-parallelising the data signals and for assigning the re-parallelised data signals to the receiving interface logic and
at least one output downstream of the receiving interface logic for the data signals and clock signals.

7. The circuit arrangement according to claim 6, wherein the deserialiser comprises:
at least one demultiplexer downstream of the clock and data recovery unit for re-parallelising the data signals as well as
at least one deframer downstream of the demultiplexer for assigning the re-parallelised data signals to the receiving interface logic.

8. The circuit arrangement according to claim 7, wherein the deframer separates the differential data signals by means of at least one decoder from the single-ended, logic-level-based data signals and assigns the re-parallelised data signals to the respective data lines.

9. The circuit arrangement according to claim 1, wherein the common signal stream is transferred between the transmission arrangement and the receiving arrangement
via at least one optical medium, and/or
via at least one electrical or galvanic link.

10. The circuit arrangement according to claim 9, wherein the electrical or galvanic link has assigned to it,
in the transmission arrangement, at least one switch for closing the electrical or galvanic link to the receiving arrangement, and
in the receiving arrangement, at least one switch for closing the electrical or galvanic link to the transmission arrangement.

11. The circuit arrangement according to claim 6, wherein the fact of reaching the state of synchronisation is communicated or signalled by the deserialiser via the logic module of the switch assigned to the receiving arrangement, via the electrical or galvanic link and via the logic module of the switch assigned to the transmission arrangement to the input of the transmission arrangement.

12. The circuit arrangement according to claim 9, wherein the fact of reaching the state of synchronisation is communicated or signalled by the deserialiser via the logic module of the switch assigned to the receiving arrangement, via the electrical or galvanic link and via the logic module of the switch assigned to the transmission arrangement to the input of the transmission arrangement.

13. A method for transmitting both
single-ended logic-level-based data signals and clock signals, and
differential data signals and clock signals,
in a form of one serialised common signal stream between at least one transmission arrangement assigned to at least one data source and at least one receiving arrangement assignable to at least one data sink, wherein reaching a state of synchronisation between the transmission arrangement and the receiving arrangement is communicated or signalled by the receiving arrangement to the transmission arrangement.

14. The method according to claim 13, wherein the transmission arrangement does not start to pass through the data signals applied to the input of the transmission arrangement, until the notification or signal has been received that the state of synchronisation has been reached.

15. The method according to claim 13,
wherein the transmission arrangement synchronises itself with a reference clock and
wherein the receiving arrangement synchronises itself with a data rate of the common signal stream as well as with at least one position of the frame of the common signal stream.

* * * * *